Patented Nov. 14, 1950

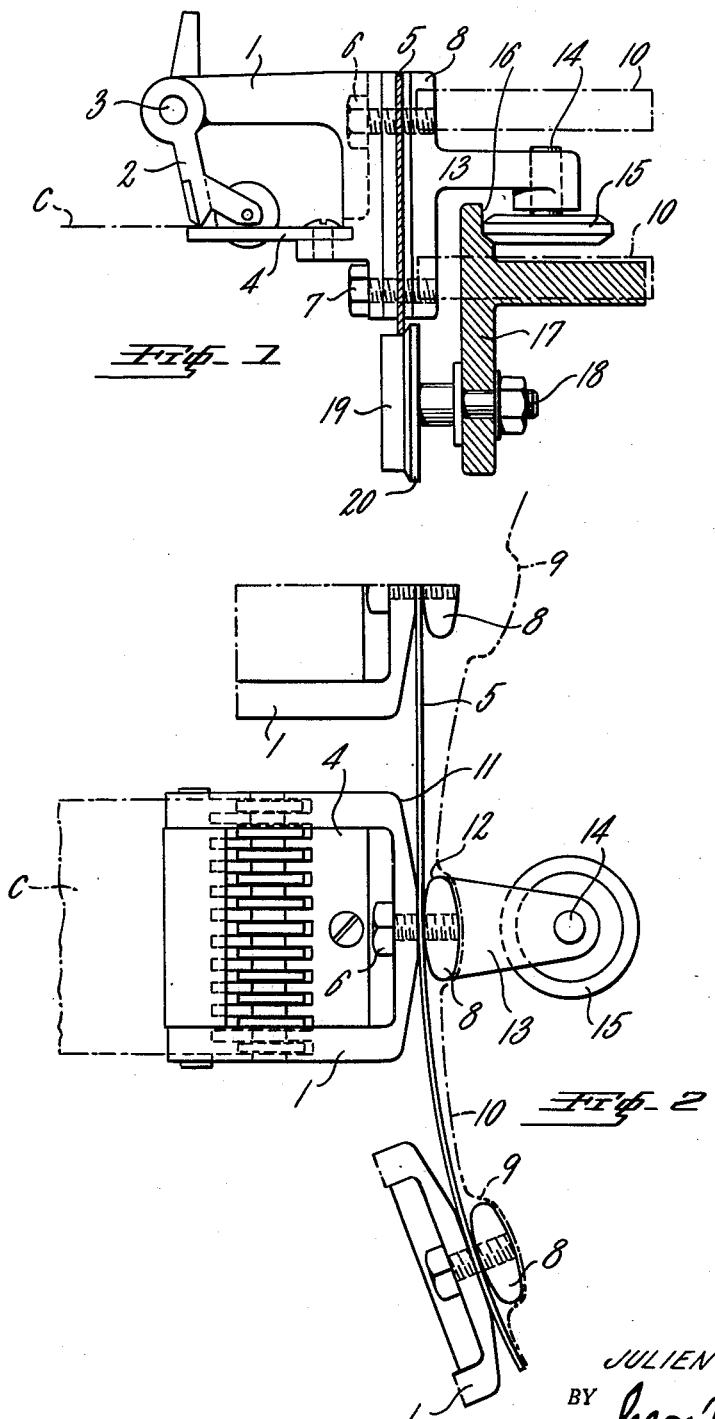

2,530,118

UNITED STATES PATENT OFFICE 2,530,118

TENTER

Julien Dungler, Basel, Switzerland

Application July 17, 1948, Serial No. 39,369
In France February 4, 1948

14 Claims. (Cl. 26—57)

It is known that the connection between the engaging or gripping members for each of the selvedges of the cloth (clips or plates provided with pins) in a tenter, is effected by means of a series of pivoted elements which are either cast integral with the clip bodies, or are independent of the clip bodies or of the plates. In either case, said elements as a whole form a chain, the links of which are connected to one another by pivot pins.

It is well known that the lubrication, not only of the slideways, but also and particularly of the pivotal connections of the various elements of the chains, involve problems for which a rational solution has not yet been found.

However, so long as the tenters only operate at low output rates, imperfect lubrication remained acceptable, since wear is comparatively slight at low speeds and the risk of oil being projected onto the cloth is unlikely. This is now no longer the case at the high speeds obtained by tenters of modern design.

Not only does the wear increase to a very great extent, which is on a par with the risk of oil projection, but at such speeds a jolting operation of the chains also occurs, which causes vibrations and irregular tension effects in the moving members of the tenter.

Finally, in the modern tenters, endeavours are made to take advantage of as high a drying temperature as possible, which causes, however, evaporation of and other changes in the lubricants.

It is, therefore, one of the primary objects of this invention to eliminate the above-mentioned and other drawbacks and, for this purpose, the invention contemplates improvements which consist in that the gripping members (clips or plates provided with pins) for each of the selvedges are fixed at predetermined distances on a common connecting element formed by an endless continuous flexible support, such as a flexible metal band, a cable, braid, or the like, the said flexible support being combined with guiding means and also with driving and return pulleys.

According to another feature of the invention, the flexible support may be composed of a plurality of endless elements which may be superimposed, juxtaposed, or otherwise combined.

According to a further feature of the invention, the aforesaid guiding means comprise a stationary guide rail and also a set of rollers with horizontal spindles, and a set of rollers with vertical spindles.

According to still another feature of the invention, the endless flexible support is provided with equidistant teeth or like projections, adapted to co-operate with corresponding cavities provided in the pulleys.

According to still a further feature of the invention, the driving teeth at the same time form the supports for one of the sets of guide rollers.

According to another feature of the invention, the flexible support is pressed, at the location of each gripping member, between the body of the gripping member and a corresponding tooth.

According to another feature of the invention, the contiguous faces of the bodies of the gripping members and of the associated tooth elements disposed, respectively, at opposite surfaces of the flexible support are arcuate in shape so as to decrease the area of contact between these bodies and elements.

Other features and advantages of the invention will moreover become apparent from the ensuing description; reference will be made to the accompanying drawing in which:

Fig. 1 is a vertical sectional and an elevational view showing the mounting and translation device of clips in a clips tentering frame.

Fig. 2 is a fragmentary plan view showing the passage of the device over a return pulley.

In the attached drawing, 1 denotes the body of a clip, 2 the nipper plate or faller of the latter which is pivoted about a pin 3 and is adapted to co-operate with a stationary base plate 4 to grip the selvedge of the cloth C to be treated. Clipping or gripping means of this type have been more clearly described in my U. S. Letters Patent No. 2,489,275.

The individual clips are mounted on and extend from one surface of an endless continuous flexible support 5, preferably a metal band made of steel, for example. However, said support may be constructed in any other suitable manner, and may be constituted, for example, by a cable, braid, or like carrier. It is to be further noted that the support 5 may comprise a plurality of endless elements combined in any manner, for example by superposing or juxtaposing elemental steel bands, etc. The cloth engaging clips 1 are fixed to the band 5 by clamping screws 6 and 7 but it is also possible to use any other suitable method of fixing, such as riveting, spot welding, etc.

At the location of each clip 1, but on the opposite surface or side of the band 5 there are provided projections or tooth elements 8 which are fixed in place by means of the same screws or attaching means 6 and 7 which are used for fixing the clips 1. Said teeth 8 are adapted to co-operate with cavities 9 provided on the circumference of two pulleys 10 which are located at the ends of the transporting arrangement in the usual manner and which serve to drive said band 5, only one of said pulleys being a driving pulley, the other being loose or idle.

It should be stressed that the face 11 of the clip body 1 and the face 12 of the teeth 8 disposed at opposite surfaces of the supporting band 5 are dome-shaped or arcuate so as to decrease the area of contact between these faces and the band and provide a certain give or mobility for said teeth and clips.

The teeth 8 are secured to horizontal arms 13, each of which supports a vertical spindle 14 on which is journalled, preferably by means of a ball bearing, a guide roller 15. Said roller 15 rolls on a track or race 16 of corresponding profile provided on a stationary guide rail 17. Said rail is provided, at the lower part thereof, with spaced apart bolts 18 on which are journalled rollers 19 provided with a flange 20. The transporting assembly 1—5—8 is so arranged that the band 5 rests edgewise on the rim or circumference of the guide rollers 19.

The roller 15 is preferably located in the plane of the clip base plate 4 in order to correctly absorb the pull exerted by the clipped cloth.

The method of mounting and of translation of the cloth engaging members or clips according to the principle of this invention has numerous advantages. The pivotal connections of the known chains are eliminated and consequently also the lubrication and the wear of the chain elements. The operation is substantially noiseless and is performed without jolts, even at very high speed. The cost of manufacture of the new transporting arrangement is considerably reduced owing to the simplicity of the flexible support. The arrangement can be used equally well for operation in a horizontal plane and for operation in a vertical plane.

The regular and accurate drive of all the clips corresponding to one of the selvedges is ensured by the cooperation of the teeth 8 with the respective cavities 9 of the driving pulley. In cases in which no risk of slipping occurs, the teeth 8 may be eliminated, the drive in such case being effected by other suitable operable means, as by friction between the supporting band 5 and the rim of the driving pulley.

In the foregoing embodiment, the movement is effected in a horizontal plane. Consequently, the necessity of passing the supporting band in the front portion of the guide rail, i. e. in the portion which is arranged diagonally at the inlet of the tenter, does not give rise to any difficulty and the obliquity can be increased as compared with that of known chain devices.

If necessary, the adhesion between the band and the pulleys may be increased by suitable linings, roughnesses of the surface of the rim of the pulleys, etc.

Having thus described the invention, what is claimed as new and desired to be secured by Letters Patent, is:

1. A transporting arrangement for cloth engaging members in tenters and like machines having a driving mechanism; comprising an endless flexible support provided with opposite surfaces, said cloth engaging members being disposed spaced apart from each other on one of said surfaces, and operable means anchored to said members and disposed at the other surface of said support, said operable means being adapted to cooperate with said driving mechanism for moving said support together with said members.

2. A transporting arrangement according to claim 1, including guide means positioned adjacent said support and for rollable contact therewith.

3. A transporting arrangement according to claim 1, wherein said flexible support comprises at least one endless and flat band element.

4. Arrangement for transporting and moving cloth engaging means in tenters and similar machines having a driving mechanism; comprising a flexible, substantially flat movable support having opposed surfaces, said cloth engaging means being fixed to one of said surfaces of said support whereby the latter extends in a plane substantially perpendicular to that of the travel of the cloth, and means arranged for position on the other surface of said support and adapted to cooperate with said driving mechanism for moving said support and said cloth engaging means in the direction of the plane in which the cloth extends.

5. Arrangement according to claim 4, including guide means for said support, first and second guide means, respectively, said first guide means being coupled to said support and movable about an axis extending in a plane substantially parallel to that of said support, said second guide means being rotatable and arranged for stationary position and for engagement with said support, the axes of said second guide means being disposed in a plane substantially parallel with said plane in which said cloth extends.

6. Arrangement according to claim 5, wherein said first guide means extend in a plane substantially in alignment with the plane in which said cloth extends.

7. A transporting arrangement for cloth engaging members in tenters and like machines having a driving mechanism; comprising a flexible support provided with opposite surfaces, said cloth engaging members being disposed spaced apart from each other on one of said surfaces, operable means arranged on the other surface of said support, said operable means being adapted to cooperate with said driving mechanism for moving said support together with said cloth engaging members, said operable means being in the form of tooth elements, and securing means common to said members and said tooth elements, said driving mechanism having cavities for cooperation with said tooth elements.

8. A transporting arrangement according to claim 7 including guide means for and positioned adjacent said flexible support, said tooth elements being connected to and supporting some of said guide means.

9. A transporting arrangement according to claim 7, wherein said flexible support is sandwiched between each cloth engaging member and the respective tooth elements.

10. A transporting arrangement according to claim 7, wherein each member and each respective tooth element are provided with respective faces contiguous to said support, said faces being dome-shaped so as to decrease the area of contact between said contiguous faces and said support.

11. An arrangement for transporting and moving means for engaging cloth and similar material in tenters and like machines having a driving mechanism; comprising a flexible, substantially flat movable support having opposite surfaces, said cloth engaging means being fixed to one of said surfaces of said support, whereby the latter extends in a plane substantially perpendicular to that of the travel of the cloth, means arranged for position on the other surface of said support and adapted to cooperate with said driving mechanism for moving said support and said cloth engaging means in the direction of travel of said cloth, guide means for said support, first guide means and second guide means, respectively, said first guide means being coupled to said support and movable about an axis extending in a plane substantially parallel to that of said support, said second guide means being rotatable and arranged for stationary position and for engagement with said support, the axes of said second guide means being disposed in a plane substantially parallel to said plane in which said cloth extends, said first guide means being positioned adjacent said support and laterally thereof, said second guide means being disposed below said support and at a level below said first guide means.

12. Arrangement according to claim 11, wherein the axes of said first guide means and of said second guide means are supported independently from each other.

13. Arrangement according to claim 11, wherein the axes of said first guide means and of said second guide means are arranged at right angles to each other, the axes of said second guide means extending perpendicular to the plane in which said flexible support travels and therebelow, the axes of said first guide means being arranged to extend parallel to the plane in which said flexible support travels, said first guide means being arranged on a level above the location of said second guide means.

14. Arrangement according to claim 11, including a guide rail by which said second guide means are carried and independently of said flexible support, said first guide means engaging said guide rail and being carried by said flexible support.

JULIEN DUNGLER.

REFERENCES CITED

The following references are of record in the file of this patent:

UNITED STATES PATENTS

| Number | Name | Date |
| --- | --- | --- |
| 127,731 | Bailey | June 11, 1872 |
| 1,050,382 | Onderdonk | Jan. 14, 1913 |
| 2,285,820 | MacKnight | June 9, 1942 |

FOREIGN PATENTS

| Number | Country | Date |
| --- | --- | --- |
| 18,746 | Great Britain | 1905 |